May 23, 1944. S. S. BARROWS 2,349,604
MAGNIFYING ATTACHMENT FOR MEASURING INSTRUMENTS AND THE LIKE
Filed June 17, 1943
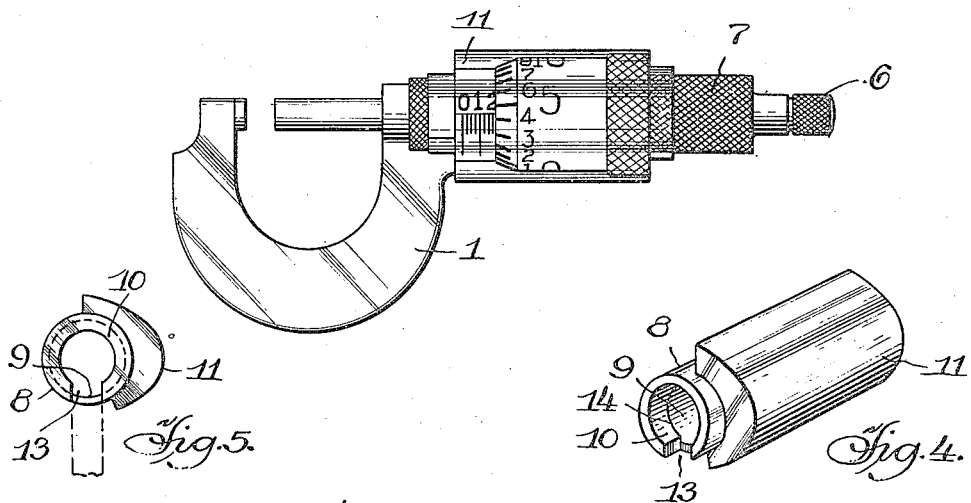
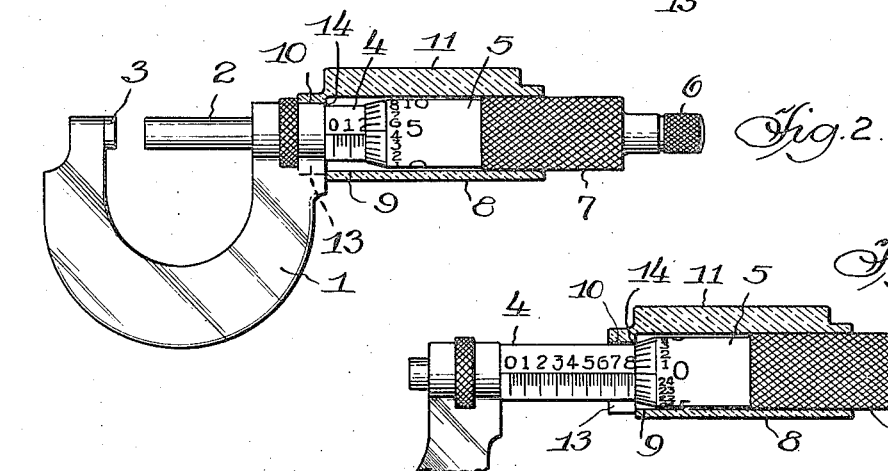
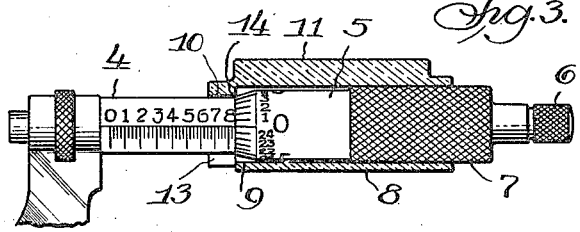
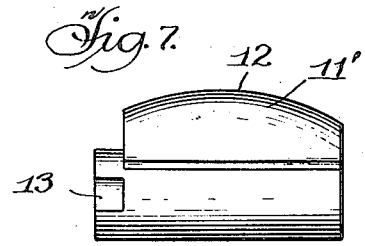
INVENTOR.
Stephen S. Barrows,
BY Parkinson & Lane
Attys.
Witness:
Chas. X. Koursh Patented May 23, 1944

2,349,604

UNITED STATES PATENT OFFICE 2,349,604

MAGNIFYING ATTACHMENT FOR MEASURING INSTRUMENTS AND THE LIKE

Stephen S. Barrows, Minneapolis, Minn.

Application June 17, 1943, Serial No. 491,103

11 Claims. (Cl. 88—39)

This invention relates to a magnifying attachment for instruments, and more particularly for measuring instruments having small numerals, letters or other indicia, which must be read correctly in order to prevent mistakes in the work being operated upon.

As is well known there are many instruments and other devices having small numerals, letters or other indicia which require careful and accurate reading in order to prevent errors in the operation being performed. Precision instruments are peculiarly of this type. Without limiting my invention, but for illustrative purposes only, I have shown and described herein my attachment as applied to a micrometer caliper in such manner that it may be quickly, easily and firmly attached thereto and when so applied will enable a quick and accurate reading of the figures representing the required measurement, by reason of the attachment so magnifying said figures that they are rendered accurately and readily readable by the operator of the caliper. When it is remembered that many jobs require measurements to be accurate within a limit of one thousandth of an inch, or less, it is at once appreciated that the necessity for correct reading of such measurement is very great. It is known that much work is spoiled throughout the country because of failure to properly read such small figures, numerals or other indicia.

One of the objects of my invention is to provide an attachment, for such and other instruments or devices, that will magnify the reading being taken and thus enable it to be read accurately and quickly without error.

Another object of my invention is to provide an attachment of the class described, that may be quickly and easily attached to, or detached from, the instrument or device with which it is to be used, without impairing its efficiency.

A further object is to provide an attachment embodying my invention, that is not easily breakable, is economical to manufacture, efficient in operation, pleasing in appearance, and will prevent the entry of dirt into parts enclosed therein.

A still further object of my invention is to provide an attachment, of the type referred to herein, which may be made of certain kinds of plastics, glass, or other suitable transparent material capable of magnification, and adaptable to the purposes intended.

Other objects, advantages and capabilities inherently possessed by my invention will later become more readily apparent.

My invention further resides in the combination, construction and arrangement of parts illustrated in the accompanying drawing, and while I have shown therein preferred embodiments, I wish it understood that the same are susceptible of modification and change without departing from the spirit of my invention.

In the drawing:

Fig. 1 is a side elevation of a micrometer caliper with the attachment embodying my invention applied thereto.

Fig. 2 is a view similar to Fig. 1 but showing my attachment in longitudinal, vertical section.

Fig. 3 is a fragmentary side elevation of a portion of a micrometer caliper showing the scale adjusted to a larger measurement than in Figs. 1 and 2, and showing the attachment of the present invention in longitudinal, vertical section.

Fig. 4 is a perspective view of an attachment embodying my invention.

Fig. 5 is an end elevation of my attachment showing in depending dotted lines a portion of the frame of a micrometer caliper in the position it will occupy when the attachment is applied thereto in operative position.

Fig. 6 is a side elevation of my novel attachment.

Fig. 7 is a side elevation of a modified form of my attachment.

Referring more in detail to the drawing I have shown and described, for illustrative purposes only, my invention as applied to a micrometer caliper. As micrometer calipers are well known, I need only describe the same generally as comprising the frame 1, spindle 2, anvil 3, sleeve 4, thimble 5, ratchet head 6, and knurled portion 7 for rotating the thimble 5. As is known, the sleeve 4 has a longitudinal datum line from which extend downwardly vertical division lines each representing twenty-five thousandths of an inch, each fourth line being extended and marked in tenths of an inch.

The beveled edge of the thimble is marked in twenty-five divisions, each representing one thousandth of an inch. By rotating the thimble until the free end of the spindle on one side and the anvil on the other, contact the object being measured, the measurement can be read on the scale and the beveled edge of the thimble, in the manner well known in such instruments. However the numerals on the longitudinal scale on the sleeve and on the circumferential scale on the beveled edge of the thimble are at the best, small, due to the fact that the micrometer caliper is itself small, hence, of necessity, the user of the caliper must look close, and strain his eyes, to endeavor to read the measurement indicated. This leads to mistakes occurring from inaccurate readings. To overcome this, and insure correct readings, my invention is provided.

My invention, as has been indicated, is a magnifying attachment, and is shown in the drawing as comprising a cylindrical portion 8 having an interior longitudinally extending cylindrical bore 9, there being formed at the forward end an inwardly extending flange 10 as best seen in Figs. 2-5. Integrally formed on that side of the cylinder 8 which will be over the measurement figures to be read during the use of the caliper, is an enlargement 11 which in addition of being transparent is of such material and is so formed that it will magnify the measurement figures thereunder to quite a substantial degree when the attachment is in operative position on the instrument, as seen in Fig. 1, when compared with Figs. 2 and 3.

As shown in Figs. 4 and 5 the central portion of the enlargement 11 and extending longitudinally thereof, is greatest in thickness, gradually diminishing in thickness, in a circumferential direction to the edges, so as to form a curved magnifying lens. In the form of attachment shown in Figs. 2-6 the outer surface of the enlargement 11 is straight in a lengthwise direction. In other words a longitudinal line drawn in said outer surface, parallel with the longitudinal axis of the attachment would be a straight line. This, with the proper material, will give magnification in the circumferential direction of the numerals, letters or other indicia, with little or no, magnification in the lateral directions of the numerals, as will be understood in the drawing.

When magnification in both directions is desired, the enlargement 11 is curved on its outer surface in both directions as will be understood in Fig. 7, in such manner as to form a lens having the characteristics just referred to. This longitudinally curved surface is indicated in Fig. 7 at 12, and the enlargement at 11'. This form of attachment of Fig. 7 will magnify the numerals or other indicia, for example the numerals in Figs. 2 and 3, both in width as well as height, thus giving a greater magnification than the form shown in Figs. 2-6. The magnification in the latter, however, will be sufficient in all cases except those where the conditions of light, or the operator's eyesight, require greater magnification.

As will be understood my attachment will be so constructed and shaped as to fit, and be operatively held on to, the particular kind of instrument with which it is to be used. When used with a micrometer caliper, as illustrated in the drawing, the forward edge of the attachment is formed with the recess or notch 13, extending through the front wall of the cylinder 8 and flange 10 to a length corresponding to the width of the flange as best seen in Fig. 4. This notch, is of a size to nicely fit over the shank of the frame when the attachment is in operative position (see Figs. 1 and 2). The enlargement 11 and the notch 13 are so positioned with relation to each other that when the notch is pushed home over the shank of the frame into the position shown in Fig. 2, the enlargement will be directly over the numerals and graduation marks of the scale and the beveled edge of the thimble, to enable them to be easily read by its operator, because of their magnification.

As seen in Fig. 2, the diameter of the bore 9 in cylinder 8 is such as to slidably receive therein the thimble 5 including the integral knurled portion 7 which serves as a turning grip for the operator's fingers, so as to permit rotation of the thimble within the attachment, as well as longitudinal movement therein when applying and removing the attachment to and from the instrument to which it is applied. Also when the attachment is in operative position on the instrument shown in the drawing, the rear edge of the throat of notch 13 will contact the adjacent edge of the frame and thus correctly position the parts.

The attachment will be prevented from falling off of the instrument by reason of the front edge portion of the bevel of the thimble contacting the rear edge 14 of the flange 10 as seen in Fig. 3. To apply the attachment to the caliper shown in the drawing, all that is necessary is to completely unscrew the thimble 5, remove it, apply the attachment over the sleeve 4, and screw the thimble back over the sleeve and into the bore of the attachment. The tightness of the fit of the sides of the notch 13 with the sides of the frame 1 will be sufficient to hold the attachment in place, with the magnifying enlargement or lens 11 over the measurement numerals to be read. To remove it the reverse steps are taken.

The attachment embodying my invention, regardless of what particular kind of instrument it is to be used with, may be made of any transparent material that is capable of being formed to have magnifying ability, to enable quick and easy reading of the numerals, letters or other indicia on the instrument to which it is applied. If desired those portions of the attachment other than the enlargement or lens may be translucent or opaque, or of other material, just so the enlargement or lens is transparent and capable of magnifying.

For the material of the enlargement or lens, and if desired the entire attachment, I prefer to use material available in the industry of plastics. One of these plastics which I have successfully used, and which is available on the market, is acrylic resin. Acrylic resins are obtained by certain treatment of acrylic acid, and in the form used in my invention is a thermoplastic solid. It can be molded and machined, is practically unbreakable, is transparent, and when properly shaped has magnifying characteristics. Acrylic resins, of the type referred to herein, are available as molding powders, cast sheets, rods, bars, tubes and the like.

Another usable plastic material is polystyrene. While I have mentioned two plastic materials that are usable in making my attachments, I do not wish to be limited thereto but may use any plastic material that is a solid, is transparent, and capable of magnification. Also if desired I may use glass, or other transparent solids capable of magnification and adaptability to my invention.

Having described my invention, I claim:

1. An atttachment for measuring instruments having measurement indicating indicia thereon that are normally somewhat difficult to read, comprising an elongated tubular body portion having a longitudinal opening therethrough adapted to receive a portion of the measuring instrument therein, said body portion having formed on one side a transparent, longitudinally extending enlargement forming a lens which, when the attachment is mounted on the instrument, will magnify said indicia and render them accurately readable, said body portion having means that will hold the tubular body portion against lateral displacement and position the lens over the indicia when the attachment is in operative position on the instrument.

2. A magnifying attachment for measuring instruments having a projecting part and having measurement indicating indicia thereon, comprising a cylindrical body portion having a longitudinal opening therethrough adapted to receive a portion of a measuring instrument, an enlargement extending along one side of said body portion and of such transparent material and so shaped as to produce magnification, said body portion having a notch formed therein at one end to receive said projecting part of the measuring instrument to hold the attachment against circumferential displacement on the instrument and position the enlargement over the indicia to magnify the same and render them easily readable.

3. A magnifying attachment for measuring instruments having a projecting part and having measurement indicating indicia thereon, comprising a cylindrical body portion having a longitudinal opening therethrough adapted to reveive a portion of a measuring instrument, an enlargement extending along one side of said body portion and of such transparent material and so shaped as to produce magnification, said body portion having a notch formed therein at one end to receive the projecting part of the measuring instrument to hold the attachment against circumferential displacement on the instrument and position the enlargement over the indicia to magnify the same and render them easily readable, said enlargement being formed of a thermoplastic plastic material.

4. A magnifying attachment for measuring instruments having a projecting part and having measurement indicating indicia thereon, comprising a cylindrical body portion having a cylindrical bore therethrough adapted to receive a portion of a measuring instrument, an enlargement extending along one side of said body portion and of such transparent material and so shaped as to produce magnification, said body portion having a notch formed therein at one end to receive the projecting part of the measuring instrument to hold the attachment against circumferential displacement on the instrument and position the enlargement over the indicia to magnify the same and render them easily readable, said enlargement being formed of an acrylic resin.

5. A magnifying attachment for measuring instruments having a projecting part and having measurment indicating indicia thereon, comprising a cylindrical body portion having a cylindrical bore therethrough adapted to receive a portion of a measuring instrument, an enlargement extending along one side of said body portion and of such transparent material and so shaped as to produce magnification, said body portion having a notch formed therein at one end to receive the projecting part of the measuring instrument to hold the attachment against rotative displacement on the instrument and position the enlargement over the indicia to magnify the same and render them easily readable, said attachment being formed of a thermoplastic plastic material having magnifying characteristics and being removable from the instrument when desired.

6. A magnifying attachment for a micrometer caliper having measurement indicating indicia thereon, comprising a cylindrically shaped body portion having an axial bore therethrough, an internal flange on one end of the body portion and formed with an axially extending notch to seat over the caliper frame, a transparent magnifying lens on one side of the body portion circumferentially spaced from the notch to cover the indicia so as to magnify the same and render them easily readable, said attachment being formed of a plastic resin having magnifying characteristics, the attachment being removable from the caliper, and the notch and lens being so positioned with relation to each other and the caliper frame that when the notch is moved longitudinally over the frame the lens will be over the indicia to be read.

7. A magnifying attachment for a micrometer caliper, comprising a body portion having an elongated cylindrical axial bore therethrough, a circumferential inwardly extending flange at one end of the body portion, the body portion having a thin wall and a thick wall, the thick wall being transparent, elongated and so formed as to constitute a magnifying lens, the thin wall having formed in one end a longitudinally extending notch adapted to be seated over the caliper frame when pushed longitudinally into position thereover, the notch being so positioned with relation to the lens that when the notch is pushed into position over the frame the lens will be positioned over the measurement indicating indicia of the caliper to magnify the same.

8. A magnifying attachment for a micrometer caliper, comprising a body portion having an elongated cylindrical axial bore therethrough, a circumferential inwardly extending flange at one end of the body portion, the body portion having a thin wall and a thick wall, the thick wall being transparent, elongated and so formed as to constitute a magnifying lens, the thin wall having formed in one end a longitudinally extending notch adapted to be seated over the caliper frame when pushed longitudinally into position thereover, the notch being so positioned with relation to the lens that when the notch is pushed into position over the frame the lens will be positioned over the measurement indicating indicia of the caliper to magnify the same, said attachment being formed of a transparent plastic resin having magnifying characteristics.

9. A magnifying attachment for a micrometer caliper having a frame, sleeve and thimble, comprising an elongated body portion having a cylindrical, axial bore therethrough, the diameter of the axial bore being constant from one end to near the other end where it decreases to form an inwardly extending circumferential flange, the greater part of the body portion having a thin wall and formed at the flanged end with a longitudinally extending notch open at one end so as to be pushed into seating position on the frame to hold the attachment on the caliper, the body portion also having a longitudinally extending thickened, transparent wall, so shaped as to form a magnifying lens, the axial bore of the attachment being adapted to receive the sleeve and spindle of the caliper and the flange being adapted to contact an end of the thimble to prevent the attachment from being removed from the caliper except when the thimble is removed from the sleeve, the notch and lens being so positioned with relation to each other that when the notch is positioned over the frame the lens will be over the measurement indicia to be read on the caliper.

10. A magnifying attachment for a micrometer caliper having a frame, sleeve and thimble, said attachment comprising a tubular body portion having a cylindrical axial bore therethrough and an inwardly extending circumferential flange at one end, said body portion also having a longitudinally extending notch in one end adapted to be seated over the frame, the attachment being slidable over the sleeve when the thimble is removed and receiving therein the thimble when it is attached to the sleeve, the flange preventing removal of the attachment from the caliper when the thimble is in place thereon, the attachment being removable when the thimble is removed, the body portion having formed on its outer surface an elongated thickened portion shaped to form a magnifying lens to enable easy reading of measurement indicia on the caliper.

11. A magnifying attachment for a micrometer caliper having a frame, sleeve, thimble and small measurment indicia thereon, said attachment comprising an elongated tubular body portion having a cylindrical bore and being slidable longitudinally of the sleeve and thimble, an elongated thickened wall on the body portion so formed as to constitute a magnifying lens for the indicia, one end of the body portion being formed with an open-ended notch to be longitudinally slidable over the frame to hold the attachment with the lens over the indicia to be read.

STEPHEN S. BARROWS.